US012647904B2

(12) United States Patent (10) Patent No.: US 12,647,904 B2
Fakoorian et al. (45) Date of Patent: Jun. 2, 2026

(54) POWER CONTROL FOR SIGNAL INTERFERENCE MANAGEMENT

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Diego, CA (US); Oghenekome Oteri, San Diego, CA (US); Weidong Yang, San Diego, CA (US); Xiang Chen, Campbell, CA (US); Yang Tang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 614 days.

(21) Appl. No.: 17/983,814

(22) Filed: Nov. 9, 2022

(65) Prior Publication Data

US 2023/0164701 A1 May 25, 2023

Related U.S. Application Data

(60) Provisional application No. 63/282,899, filed on Nov. 24, 2021.

(51) Int. Cl.
H04W 52/24 (2009.01)
H04L 5/14 (2006.01)
(52) U.S. Cl.
CPC ............. H04W 52/243 (2013.01); H04L 5/14 (2013.01)

(58) Field of Classification Search
CPC ........... H04W 52/243; H04W 52/1423; H04W 52/14; H04W 52/04; H04W 52/24; H04L 5/14
See application file for complete search history.

(56) References Cited

U.S. PATENT DOCUMENTS

| | | | | |
|---|---|---|---|---|
| 2020/0343995 A1* | 10/2020 | Shao | ...................... | H04L 1/1819 |
| 2020/0374807 A1* | 11/2020 | Zhang | ................... | H04L 5/0091 |
| 2021/0058947 A1* | 2/2021 | Lin | ....................... | H04W 72/04 |

FOREIGN PATENT DOCUMENTS

| | | |
|---|---|---|
| EP | 3739970 A1 | 11/2020 |
| KR | 10-2020-0006126 A | 1/2020 |

OTHER PUBLICATIONS

International Preliminary Report on Patentability issued on May 2, 2024 in connection with Application No. PCT/US2022/050519.
(Continued)

*Primary Examiner* — John J Lee
(74) *Attorney, Agent, or Firm* — Eschweiler & Potashnik, LLC; Matthew Glause

(57) ABSTRACT
Techniques, described herein, include solutions for enabling power control processes within a wireless telecommunications network. A base station may operate in a full duplex mode by simultaneously sending and receiving signals to user equipment (UEs). Power control processes may be implemented to eliminate or mitigate signal interference, such as self-interference at the base station or cross link interference (CLI) at a UE. The power control processes may include causing UEs to transmit signals, a UE and/or the base station measuring interference and causing the base station and/or UEs to modify transmission power to address the signal interference.

20 Claims, 12 Drawing Sheets

(56)          References Cited

OTHER PUBLICATIONS

3rd Generation Partnership Project; Technical Specification Group
Radio Access Network; NR; Physical layer procedures for control;
(Release 16); 3GPP TS 38.213 V16.7.0 (Sep. 2021); http://www.
3gpp.org.
Korean Office Action dated Feb. 6, 2026 in connection with
application No. 10-2024-7016838.

* cited by examiner

POWER CONTROL FOR SIGNAL INTERFERENCE MANAGEMENT

PRIORITY

This application claims the benefit of U.S. Provisional Application No. 63/282,899 filed Nov. 24, 2021, which is incorporated herein by reference in their entirety.

FIELD

This disclosure relates to wireless communication networks including techniques for power and transmission management.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how wireless devices (e.g., user equipment (UE), base stations, etc.) send and receive information, including signal interference that may arise from wireless transmissions.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
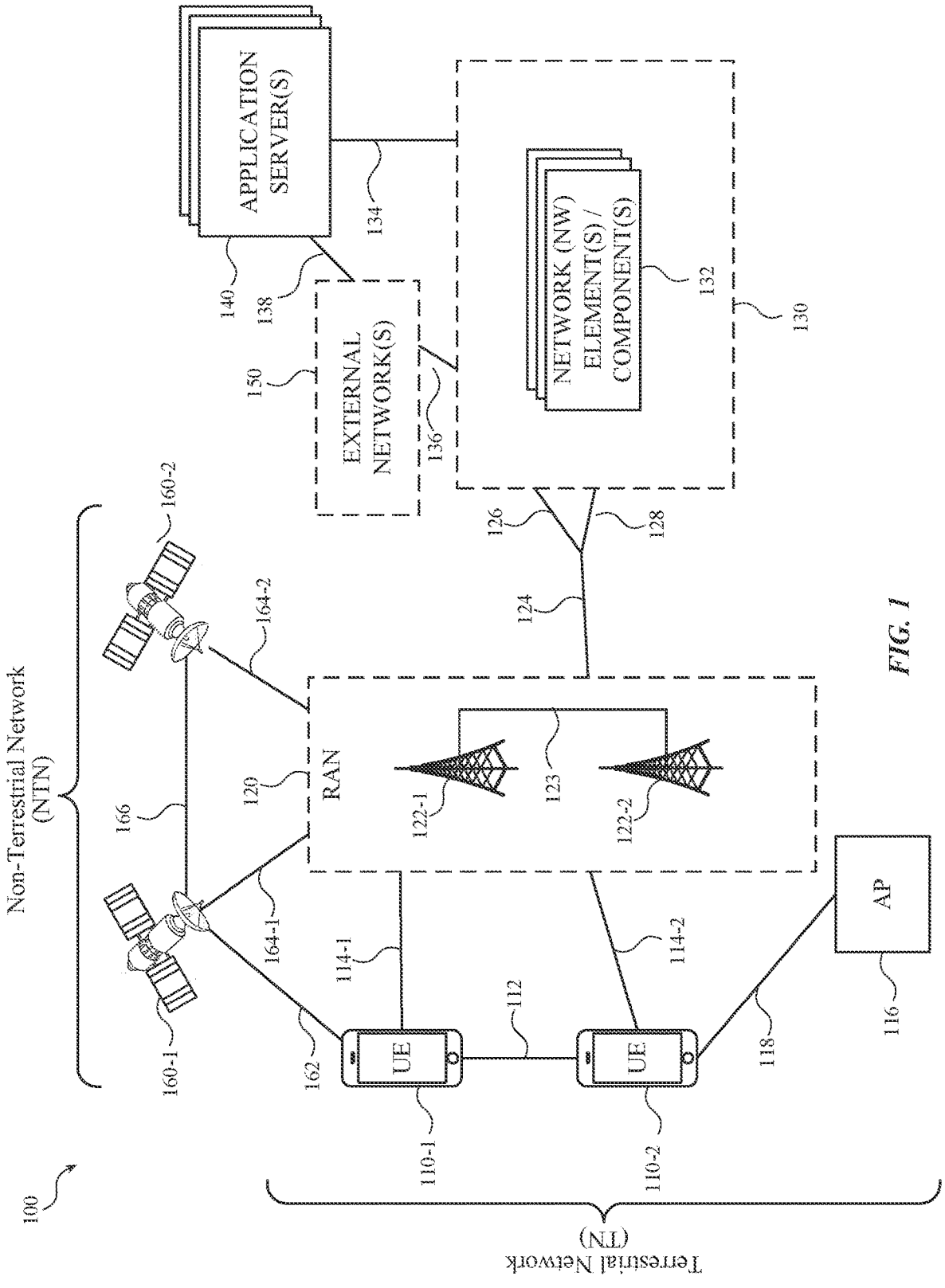
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Telecommunication networks may include user equipment (UEs) capable of communicating with base stations and other network nodes. UEs and base stations may implement reference signal (RS) measurement techniques, power control techniques, etc. to ensure that radio signals are transmitted and received reliably. Increasing transmission power may help ensure a signal is clear and strong when received, while decreasing transmission power may help ensure efficient battery usage.

In some scenarios, a base station and/or UE may be operating in a full duplex (FD) mode of communication (e.g., sending and receiving radio signals simultaneously. For example, a base station may be operating in FD when sending downlink (DL) signals to some UEs and receiving uplink (UL) signals from other UEs. Self-interference (SI) at the base station may occur when the DL signals and UL signals interfere with one another. Similarly, a UE operating in a FD mode may also suffer from SI when DL and UL signals interfere with one another. Even in orthogonal frequency-division multiplexing (OFDM) scenarios, which may include a frequency space (or guard band) in between DL and UL signals, SI may still occur. In some scenarios, signal interference (i.e., cross-link interference (CLI)) may occur between two UEs, when for example, a DL signal to one UE is interrupted by the UL signal from another UE.

Currently available telecommunication technologies fail to address one or more facets of SI and CLI. For example, currently available techniques fail to provide adequate solutions for enabling UEs to implement power control techniques based on whether the base station is operating in a FD with SI or a time division duplex (TDD) mode without SI. As another example, currently available techniques fail to provide adequate solutions for enabling base stations and UEs to implement power control techniques based on whether CLI is occurring at a UE.

The techniques described herein provide solutions for these deficiencies. For instance, a base station may provide a UE with open loop power control instructions (e.g., a base station may provide a UE with different open loop power control parameters) to address scenarios where signals at the base station are experiencing SI. The open loop power control instructions may cause the UE to adjust (e.g., increase) the transmission power for UL signals such that the impact of SI at the base station is reduced. In another example, the base station may use a closed loop power control process. For instance, the base station may determine that the base station is operating in a FD mode and/or detect SI or CLI, and in response, the base station may instruct the UE to implement suitable power control measures.

In some implementations, the base station may indicate, to the UE, a set of symbols and/or physical resource blocks (PRBs), in which base station is operating at FD and/or experiencing SI. Depending on the scenario, the base station may do so in one or more ways, including via a flag or bitmap included in downlink control information (DCI), group common (GC) DCI, or higher layer signaling (e.g., a radio resource control (RRC) message, media access control (MAC) control element (CE), etc.). For scenarios involving CLI, where the UL signals from one UE (the aggressor UE or UEa) are causing CLI with the DL signals of another UE (the victim UE or UEv), a base station may indicate to the UEv to transmit a sounding reference signal (SRS) and indicate to the UEa to measure an SRS Reference Signal Received Power (RSRP). The SRS may be transmitted at a specified transmission (Tx) power, such that the UEa may receive and measure the strength of the signal and implement power control techniques for UL signals accordingly.

In some implementations, UEv may also, or alternatively, cause the base station to adjust transmission power to help mitigate CLI. The UEv may request a DL transmission power adjustment from the base station. In response, the base station may configure the UEv with null-tones that may span multiple symbols and cause the UEv to measure a receive strength signal indicator (RSSI) over the null-tones. In some implementations, the base station may also cause the UEa to transmit an SRS to the UEv. The base station may also cause the UEv to measure the SRS for CLI during zero power (ZP) channel state information (CSI) reference signal (RS) tones. The UEv may report the measurements, and the base station may adjust DL Tx power based on the measurements. Additionally, the UEv may report a hybrid automatic repeat request (HARQ) acknowledgement (ACK), CLI measurement, and/or recommendation for DL power adjustment, the timing specified for doing so may depend on the reporting capabilities of the UEv. Depending on the scenario, one or more PUCCHs may be used for reporting each type of information. Accordingly, the techniques described herein include a variety of dynamic solutions for mitigating SI and CLI by measuring interference and adjusting transmission power.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/ or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
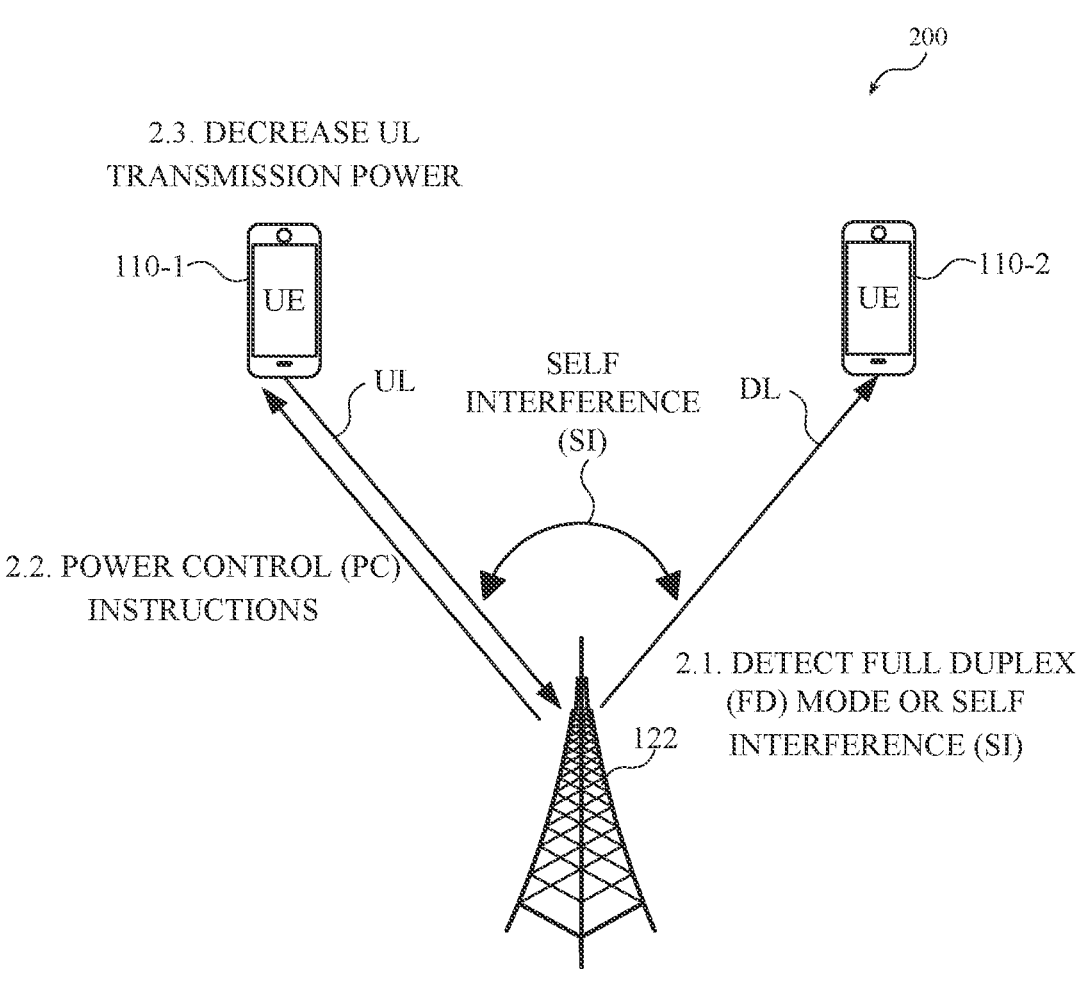
FIG. 2 is a diagram of an example overview of using transmission power control to manage self-interference (SI).

FIG. 2 is a diagram of an example overview 200 of using transmission power control to manage SI. As shown, base station 122 may operate in FD mode to communicate with multiple UEs 110-1 and 110-2. In FD mode, base station 122 may receive UL transmissions from one UE 110-1 while sending a DL transmission to another UE 110-2. The UL signal and the DL signal may interfere with one another at base station 122, thereby creating a SI scenario. As such, base station 122 may be configured to determine or detect when base station 122 enters FD mode and/or when signals to and from base station 122 create SI that exceeds a pre-defined signal interference threshold (at 2.1). In response, base station 122 may send UE 110-1 power control instructions (at 2.2). UE 110-1 may receive the instructions to adjust (e.g., decrease) the amount of transmission power used by UE 110-1 for UL signals (at 2.3). In some implementations, base station 122 may also, or alternatively, increase the amount of power used for DL signals. In doing so, a signal strength differential, between UL signals and DL signals, may be increased so that base station 122 may operate in FD mode with a reduced amount of SI.

Figure 3:
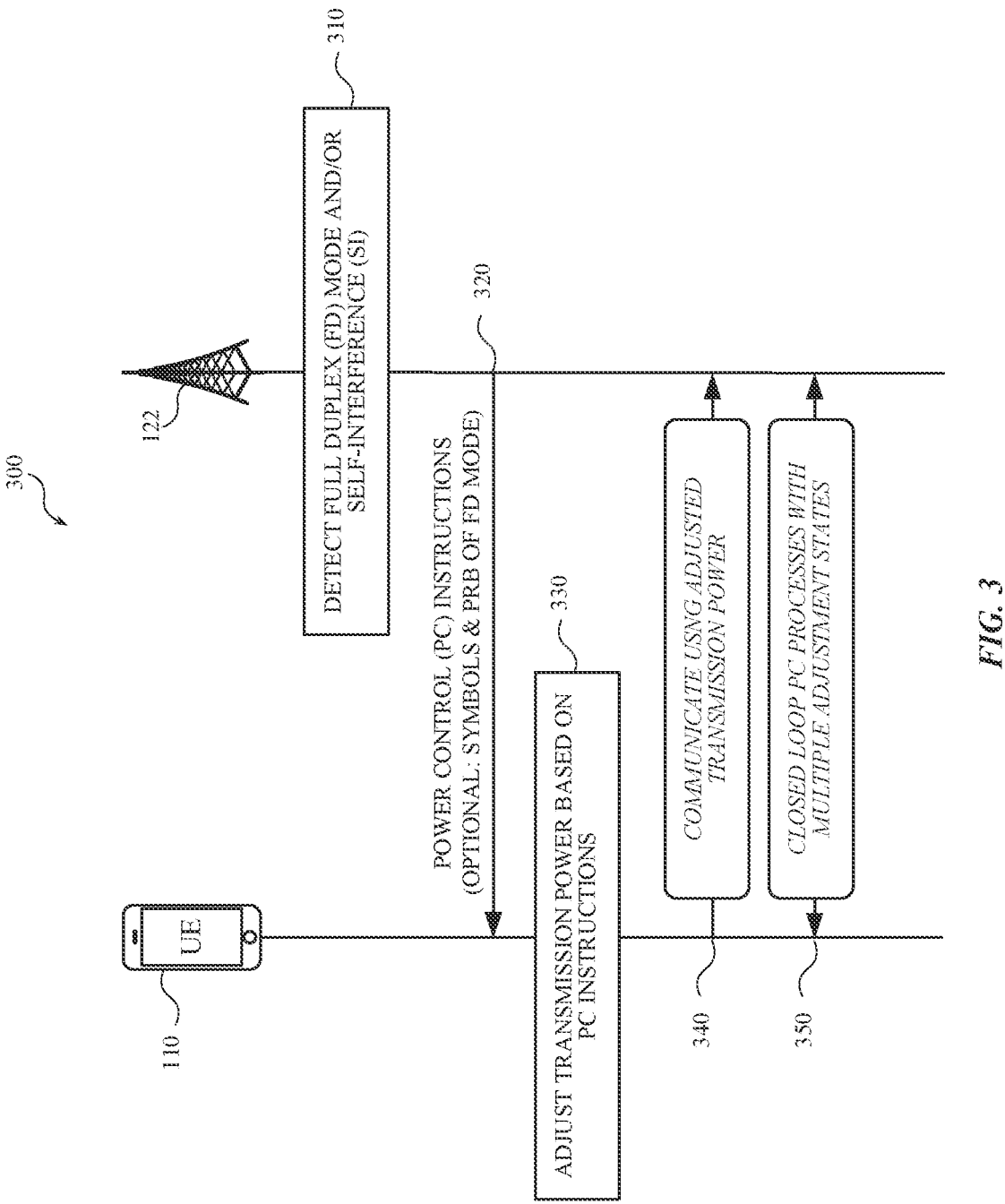
FIG. 3 is a diagram of an example of a process for using power control to manage SI.

FIG. 3 is a diagram of an example of a process 300 for using power control to manage SI. Process 300 may be implemented by UEa 110-1, UEv 110-2, and base station 122. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3.

As shown, process 300 may include base station 122 detecting a FD mode and/or SI (at 310). For example, base station 122 may communicate with UEs 110 in a half-duplex (HD) mode or a FD mode. In HD mode, base station 122 may schedule transmissions such that there are no simultaneous UL and DL transmissions (e.g., PDSCH/PUSCH transmissions). By contrast, in FD mode, base station may schedule simultaneous UL and DL transmissions, thus giving rise to the possibility of SI between UL and DL signals. In some implementations, base station 122 may monitor UL and DL signals to determine whether interference is occurring and how much. Base station 112 may also compare an amount of measured SI with a predefined threshold to determine whether to implement power control techniques to reduce SI.

Process 300 may also include base station 122 sending power control instructions to UE 110 (at 320). For example, the instructions may include, or enable UE 110 to determine, one or more power control parameters (e.g., a power output (Po), PL compensation (α), etc.) for adjusting a transmission power of UL transmissions. The instructions may also, or alternatively, include scheduling and/or resource information (e.g., times, symbols, PRBs, BWPs, carriers, etc.) for adjusting UL transmission power. The power control instructions (e.g., power control parameters, scheduling information, and/or resource information, etc.) may be for (e.g., limited to) PUSCH/PUCCH transmissions and/or times when base station 122 is operating in FD mode. In some implementations, different power control parameters may be associated with different power control conditions, such that UEs 110 and/or base station 122 may be preconfigured to respond with certain power control measures and/or instructions based on, for example, a level of SI, a current transmission power, one or more power control parameters, etc.

In some implementations, base station 122 may use higher layer signaling to provide the power control instructions. Additionally, or alternatively, base station 122 may provide the power control instructions via one or more RRC messages, DCI messages, MAC CEs, or a combination thereof. For example, the power control instructions may include an indication of whether SI exists at base station 122, which may be transmitted via UE-specific DCI (e.g., DCI scheduling a PUSCH may include a flag indicating whether SI exists at a serving cell). In another example, base station 122 may communicate the power control instructions and/or indication may be via a group common (GC) DCI, which may involve a bit map. Additionally, or alternatively, a reference subcarrier spacing (SCS) over the entire carrier may define which PRBs, over a set of indicated symbols indicated in a bitmap, are impacted by the SI at base station 122. In some implementations, base station 122 may use RRC messages and/or MAC-CEs to indicate which time-frequency resources are impacted by the SI at base station 122. In some implementations, an indication that SI is occurring at base station 122 may prompt UE 110 to recalculate as described herein (e.g., via separate open-loop parameters (Po, α) and/or a new interpretation of closed-loop parameters (such as TPC table).

In some implementations, the power control instructions may include an extended transmit power control (TPC) table, which may be a TPC table that is larger (e.g., uses more bits) than a legacy TPC table. UE 110 may be configured to use a TPC table to determine UL transmission power. A legacy TPC table may use two bits to indicate 1 of 4 values (e.g., −1, 0, 1, or 3 dB). An extended TPC table may, for example, include an extra bit (for a total of 3 bits) to also indicate whether the base station 122 is operating in FD mode and UL transmission power is to be adjusted. In such implementations, the power control instructions may include a TPC command message.

In some implementations, the legacy table may be used for both HD and FD scenarios. In such implementations, the power control instructions include an indication that UE 110 is to reinterpret the values of the legacy TPC table. For example, the legacy TPC table values may be −1, 0, 1, and 3 dB, and an indication from base station 122 for UE 110 to re-interpret the TPC table may cause UE 110 to interpret the TPC table values as 0, 3, 6, and 9 dB. Base station 122 may implicitly or explicitly indicate whether UE 110 is to re-interpret the TPC table. For example, the power control instructions may be an indication that base station 122 is operating in a FD mode, which may imply that UE 110 is to adjust UL transmission power. In another example, the power control instructions may provide UE 110 with different power control parameters (e.g., Po, PL compensation (α), etc.), which may be an explicit indication that UE 110 is to adjust UL transmission power. As described herein, reference to a "legacy" interpretation, process, operation, determination, etc., may refer to an interpretation, process, operation, determination, etc., known prior to the techniques described herein.

Process 300 may also include UE 110 adjusting a transmission power based on the power control instructions (at 330). For example, UE 110 may determine a change (e.g., a decrease) in transmission power based on a power output (Po) parameter, a path loss (PL) compensation factor (α), a power control adjustment state parameter (l), and more. UE 110 may also determine, based on the power control instructions, scheduling and/or resources to which the power adjustment is to apply. Additionally, upon determining the adjusted transmission power, UE 110 may communicate with base station 122 using the new transmission power (at 340).

Process 300 may also include closed loop power control processes with multiple adjustment states (at 350). For example, as base station 122 and UE 110 continue communicating with one another, closed loop power control processes may be performed. A closed loop power control process may include a transmit power control (TPC) command Each closed loop power control process may be based on one or more factors, including an indication of a PUSCH power control adjustment state index (l). A power control adjustment state index (l) may correspond to a PUSCH power control adjustment associated with a parameter set configuration (j) of a UL BWP (b) of carrier (f) of serving cell (c). In legacy systems, power control adjustment states may be limited to two states, where l is a one-bit indicator (0 or 1) of the power control adjustment state. By contrast, the techniques provided herein may include scenarios in which there are multiple (e.g., l>1) power control adjustment states.

Base station 122 may provide UE 110 with a time-frequency pattern or schedule for FD mode scenarios. New power control parameters (e.g., l>1 and the parameter pair Po and α) may be used autonomously for PUSCH transmission scheduled in these FD mode slots. Similar to the example described above, where values of a TPC table may be interpreted differently based on an indication of a HD mode or FD mode, indication of the power control adjustment state may imply the use of different power control adjustment parameters for determining an appropriate change in transmission power.

Also, while not shown in FIG. 3, information about an intended FD-mode slot configuration and potential UL-DL frequency domain location for a given base station 122 may be supported over backhaul to enable interference mitigation. For example, base stations 122 may share transmission information with one another to enable transmission coordination between the base stations 122 such that signal interference may be avoided or mitigated. For example, base stations 122 near one another may coordinate (e.g., offset) changes between HD and FD modes and frequency domains to reduce the potential for signal interference that might otherwise become problematic.

Figure 4:
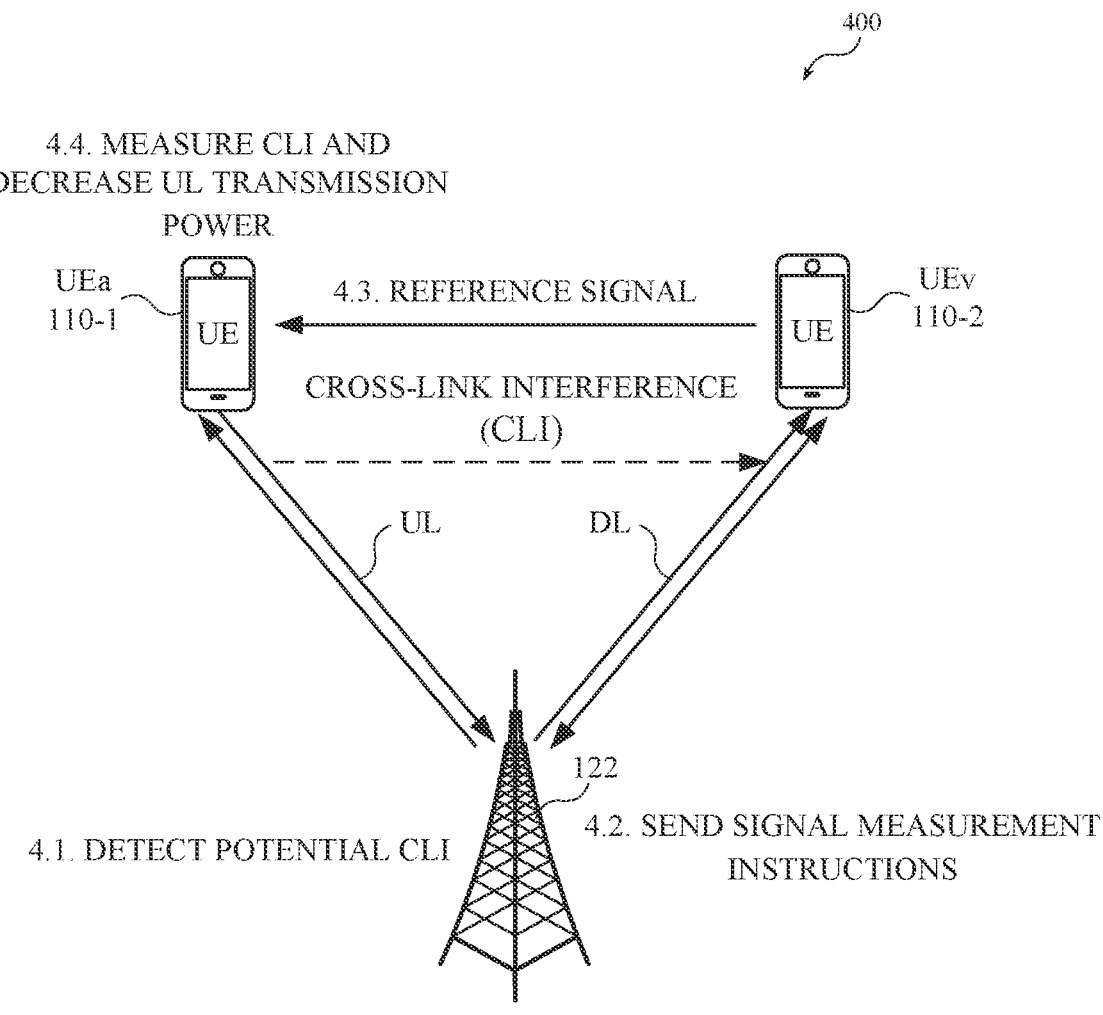
FIG. 4 is a diagram of an example overview of using user equipment (UE) power control to manage cross-link interference (CLI).

FIG. 4 is a diagram of an example overview 400 of using UE 110 power control to manage CLI. As shown, base station 122 may operate in FD mode to communicate with multiple UEs 110-1 and 110-2. In FD mode, base station 122 may receive UL transmissions from one UE 110-1 while sending a DL transmission to another UE 110-2. The UL signal of UE 110-1 may create CLI with the DL signal to UE 110-2. In such a scenario, UE 110-1 may be referred to as an aggressor UE (UEa), and UE 110-2 may be referred to as a victim UE (UEv). Base station 122 may be configured to determine or detect scenarios that may involve CLI (e.g., scenarios in which a UL signal from one UE 110 occurs at the same time a DL signal is sent to another UE 110) (at 4.1).

In response, base station 122 may send signal measurement instructions to UEs 110-1 and 110-2 (4.2). In response to the measurement instructions, the UEv 110-2 may transmit an SRS to UEa 110-1. Upon detecting the SRS, UEa 110-1 may measure the SRS by performing an SRS-RSRP measurement on the same beam that UEa 110-1 uses to transmit PUSCH communications (at 4.3 and 4.4). In response to measuring the SRS, UEa 110-1 may determine whether CLI is occurring (e.g., based on determining PL), and if so, may reduce the power of future UL transmissions accordingly to eliminate or minimize CLI (at 4.4). In some implementations, UEa 110-1 may instead provide the results of measuring the SRS to base station 122, and base station 122 may determine whether CLI is occurring and/or provide UEa 110-1 with PC instructions (which may include a power output (Po) parameter, a path loss (PL) compensation factor (α), a PC adjustment state parameter (l), resource information, etc.) for adjusting UL transmission power.

13                                                    14

Figure 5:
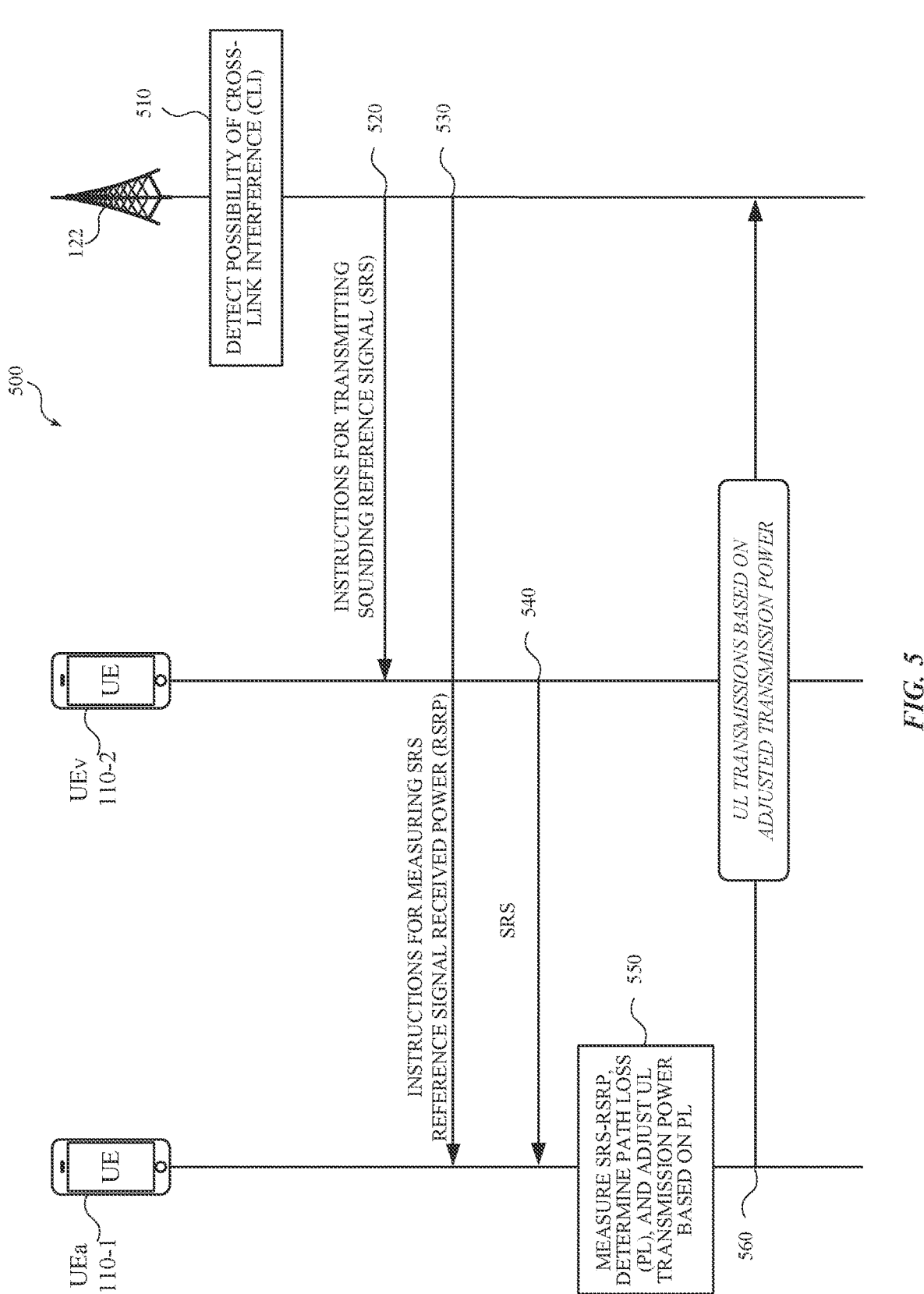
FIG. 5 is a diagram of an example of a process for using UE power control to manage CLI.

FIG. 5 is a diagram of an example of a process 500 for using UE power control to manage CLI. Process 500 may be implemented by UEa 110-1, UEv 110-2, and base station 122. In some implementations, some or all of process 500 may be performed by one or more other systems or devices, including one or more of the devices of FIG. 1. Additionally, process 500 may include one or more fewer, additional, differently ordered and/or arranged operations than those shown in FIG. 5. In some implementations, some or all of the operations of process 500 may be performed independently, successively, simultaneously, etc., of one or more of the other operations of process 500. As such, the techniques described herein are not limited to a number, sequence, arrangement, timing, etc., of the operations or process depicted in FIG. 5.

As shown, process 500 may include base station 122 detecting a possibility of CLI between UEs 110 (at 510). In some implementations, base station 1220 may detect this upon simultaneously receiving a UL signal (e.g., from UEa 110-1 and transmitting a DL signal to UEv 110-2) or entering a FD mode. In response, base station 122 may send, to UEv 110-2, instructions for transmitting an SRS (at 520). The SRS indicated may be an aperiodic (A) SRS (A-SRS) transmission. An A-SRS transmission may include an indication from base station 122 that is over DCI (e.g., PDCCH) unlike periodic or semi-persistent SRS. The instructions may be sent via DCI scheduling for a PDSCH used by UEv 110-2. Additionally, or alternatively, instructions may include an instruction to communicate the SRS using a same beam as the PDSCH. Base station 122 may also send, to UEa 110-1, instructions for measuring an SRS-RSRP from UEv 110-2 (at 530). The instructions may be sent via DCI scheduling for a PUSCH used by UEa 110-1. In some implementations, the measurement instructions sent to UEa 110-1 and UEv 110-2 may be sent via the same DCI. Additionally, or alternatively, measurement instructions for multiple UEa 110-1 devices and/or multiple UEv 110-2 devices may be sent via GC-DCI.

UEv 110-2 may communicate an SRS to UEa 110-1 (at 540). The SRS may serve not only as clear to send (CTS) signal for UEa 110-1 but also as an acknowledgement, back to base station 122, for reception of the DCI. UEs 110-1 may be preconfigured to use a specified or preconfigured transmission power for the SRS, such that both UEa 110-1 and UEv 110-2 know of the SRS transmission power. In some implementations, base station 122 may instead provide the transmission power to UEa 110-1 and UEv 110-2 (e.g., via DCI). UEa 110-1 may measure an SRS-RSRP based on the SRS, may determine, based on the SRS-RSRP, a PL for the SRS, and may adjust UL transmission power based on the PL (at 550). UEa 110-1 may determine the PL based on SRS transmission power minus the SRS-RSRP (e.g., the $RSRP_{SRS}$). In some implementations, the $RSRP_{SRS}$ value may be a filtered RSRP value using filter coefficients indicated to UEa 110-1 by base station 122. In some implementations, the SRS may be a periodic SRS. Additionally, or alternatively, the $RSRP_{SRS}$ value may be a physical layer (L1) RSRP.

UEa 110-1 may determine an adjusted UL transmission power as a minimum of a legacy procedure and a $P'$ value, where:

$$P' = 10\log_{10}\left(M_{RB}^{PUSCH}\right) + \alpha' \cdot PL' + P'_o$$

The $P'$ value may be based on a PUSCH bandwidth (M) expressed in terms of a number of resource blocks for a PUSCH transmission, the PL determined by UEa 110-1, a power output (Po), and a PL compensation (α). While not shown in FIG. 5, in some implementations, the power output (Po) and the PL compensation (α) may be indicated to UEa 110-1 by base station 122 (e.g., via higher layer signaling and/or based on a recommendation from UEv 110-2).

In some implementations, the power output (Po) and the PL compensation (α) may be indicated to UEa 110-1 by UEv 110-2 (e.g., via a physical sidelink shared channel (PSSCH), physical sidelink feedback channel (PSFCH), or physical sidelink control channel (PSCCH)). In some implementations, the power output (Po) and the PL compensation (α) may be the same as the power output (Po) and the PL compensation (α) for UL communications (e.g., PUSCH communications). Alternatively, the PL compensation (α) value may be a static value, such as 1. In scenarios where UEa 110-1 receives an SRS from multiple UEv 110-2, UEa 110-1 may calculate an adjusted UL transmission power for each SRS and select the lowest adjusted UL transmission power. Additionally, or alternatively, UL power control based on UEv 110-2 may be enabled or disabled (e.g., by DCI from base station 122). In some implementations, a power headroom report (PHR) may be determined as a difference between maximum transmission power (Pcmax) and the minimum of previously determined transmission power and $P'$ value. UEa 110-1 may use the adjusted UL transmission power to for UL transmissions to base station 122.

Figure 6:
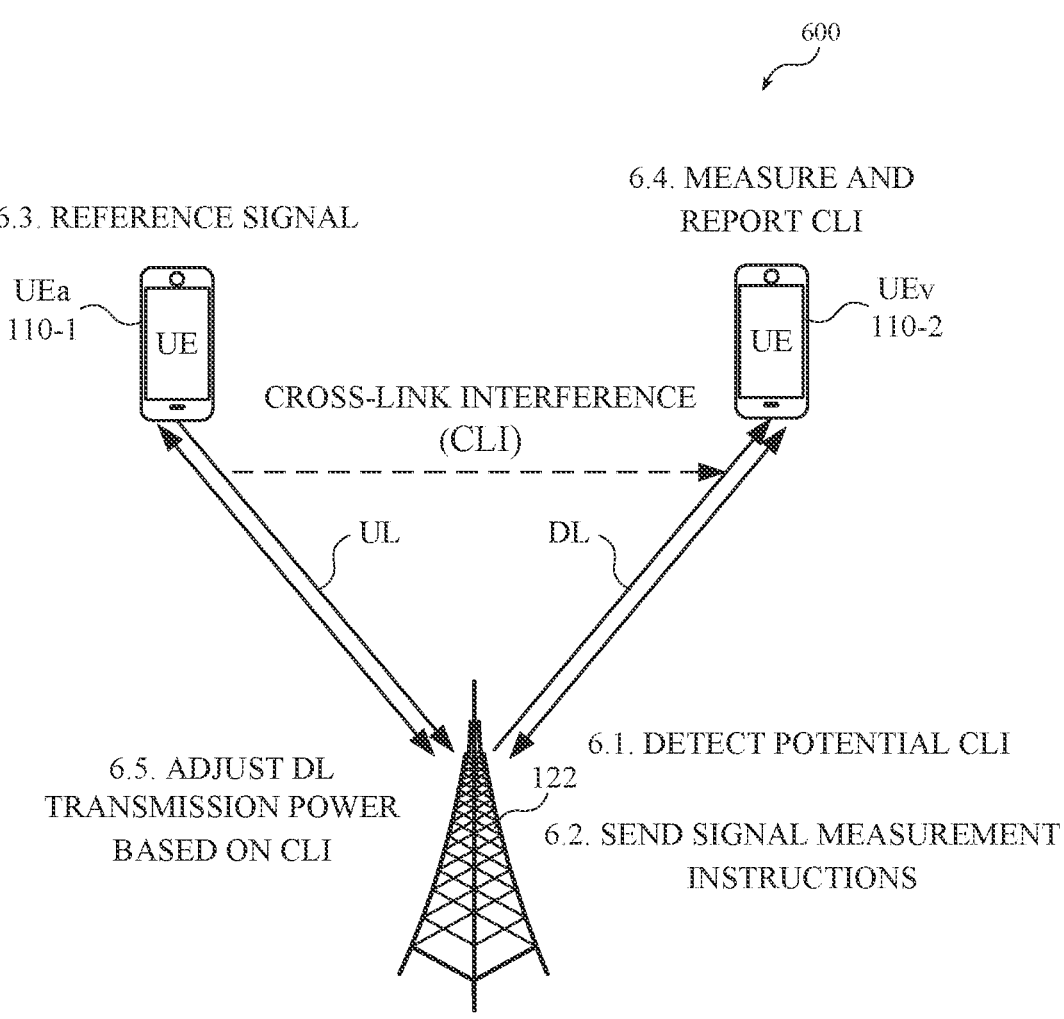
FIG. 6 is a diagram of example overview of using base station power control to manage CLI.

FIG. 6 is a diagram of example overview 600 of using base station power control to manage CLI. Base station 122 may operate in FD mode to communicate with multiple UEs 110-1 and 110-2. In FD mode, base station 122 may receive UL transmissions from one UE 110-1 while sending a DL transmission to another UE 110-2. The UL signal of UE 110-1 may create CLI with the DL signal to UE 110-2. In such a scenario, UE 110-1 may be referred to as an aggressor UE (UEa), and UE 110-2 may be referred to as a victim UE (UEv). Base station 122 may be configured to determine or detect scenarios that may involve CLI (e.g., scenarios in which a UL signal from one UE 110 occurs at the same time a DL signal is sent to another UE 110) (at 6.1).

In response, base station 122 may send signal measurement instructions to UEs 110-1 and 110-2 (6.2). In response to receiving the measurement instructions, UEa 110-1 may transmit an SRS to UEv 110-2 or use a PUSCH to transmit another type of signal that may be measured by UEv 110-2 (at 6.3). After receiving the measurement instructions, UEv 110-2 may measure an RSSI during null tones that may include multiple symbols (at 6.4). UEa 110-1 may transmit the SRS during some, but not all, of the symbols of the null tones. UEv 110-2 may determine a CLI based on the RSSI measurements (e.g., based on a difference between RSSI measurements with and without the SRS) and report the CLI to base station 122 via the PUCCH at 6.4). Base station 122 may receive the CLI information from UEv110-1 and may adjust DL transmission control power accordingly (at 6.5). While not shown, in some implementations, base station 122 may also, or alternatively, notify (e.g., through a TPC table, a flag in DCI, etc.) UEa 110-1 of the CLI situation, which may cause UEa 110-1 to implement one or more PC techniques described herein.

Figure 7:
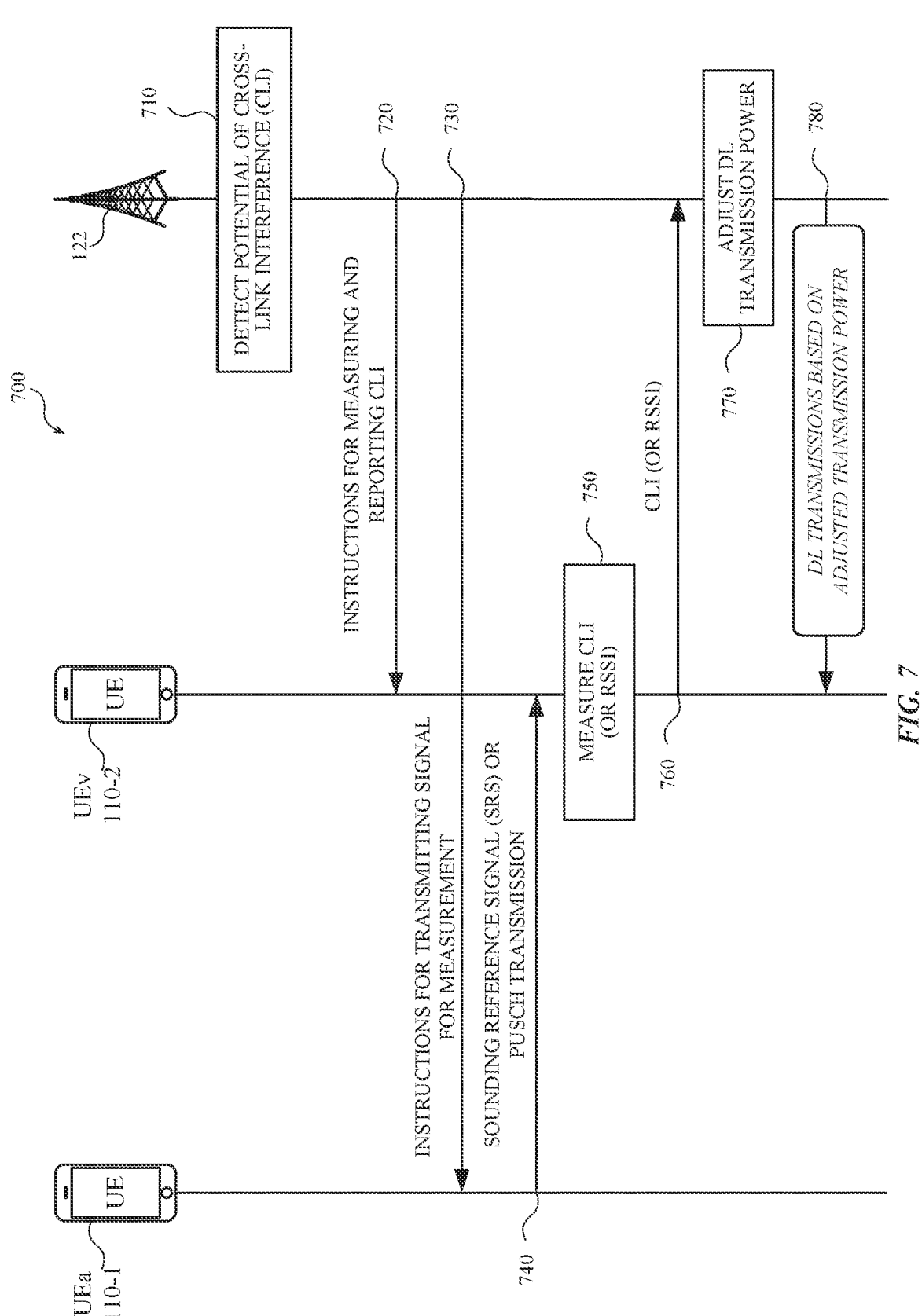
FIG. 7 is a diagram of example of a process for using base station power control to manage CLI.

FIG. 7 is a diagram of example of a process 700 for using base station power control to manage CLI. Process 700 may be implemented by UEa 110-1, UEv 110-2, and base station 122. In some implementations, some or all of process 700 may be performed by one or more other systems or devices, including one or more of the devices of FIG. 1. Additionally, process 700 may include one or more fewer, additional, differently ordered and/or arranged operations than those shown in FIG. 7. In some implementations, some or all of the operations of process 700 may be performed independently, successively, simultaneously, etc., of one or more of the other operations of process 700. As such, the techniques described herein are not limited to a number, sequence, arrangement, timing, etc., of the operations or process depicted in FIG. 7.

As shown, process 700 may include base station 122 detecting a possibility or potential of CLI between UEa 110-1 and UEv 110-2 (at 710). In some implementations, base station 1220 may detect this upon simultaneously receiving a UL signal (e.g., from UEa 110-1) and transmitting a DL signal (not shown). In response, base station 122 may send, to UEv 110-2, instructions for measuring and reporting CLI (at 720). The instructions may be sent as DCI via a PDSCH or a GC-DCI, and the instructions may be for UEv 110-2 to measure RSSI over null-tones allocated to a span of multiple symbols. The instructions for measuring and reporting may include instructions for measuring and reporting periodically or aperiodically. In some implementations, some or all of the instructions may be received via MAC CE. Base station 122 may also send, to UEa 110-1, instructions for transmitting an SRS to UEv 110-2 during one or more of the null tones of UEv 110-2 (at 730). In some implementations, the instruction may be for transmitting a signal using the PUSCH. In some implementations, the instructions for transmitting a signal to the UEv 110-2 may be limited to transmitting during one or more, but not all, of the null tones of UEv 110-2. Doing so may enable UEv 110-2 to measure and compare RSSIs from with and without the SRS signal from which CLI may be determined by UEv 110-2 and/or base station 122.

UEa 110-1 may communicate an SRS (or PUSCH message) to UEv 110-2 (at 740). The SRS may be a persistent SRS (P-SRS) or a semi-persistent SRS (SP-SRS). The SRS may be transmitted during some, but not all, of the null-tone symbols of UEv110-2. UEv110-2 may measure or determine CLI (at 750). In some implementations, UEv110-2 may measure CLI by measuring an RSSI during each of the null-tones of UEv110-2. Additionally, since the SRS may be transmitted during some, but not all, of the null-tones, UEv110-2 may determine an RSSI for scenarios in which UEa 110-1 has transmitted an SRS (or PUSCH message) and an RSSI for scenarios in which UEa 110-1 has not transmitted an SRS (or PUSCH message). UEv110-2 may determine CLI based on a difference between the RSSI for scenarios in which UEa 110-1 has transmitted an SRS (or PUSCH message) and the RSSI for scenarios in which UEa 110-1 has not transmitted an SRS. In some implementations, UEv 110-2 may receive instructions, from base station 122, to measure RSSI and/or CLI via periodic configuration information through RRC and/or semi-persistent configuration through MAC CE. In some implementations, the null tones and/or RSSI measurement patter may be configurable (e.g., tones×4 symbols, 3 tones×2 symbols, etc.) based on information or instructions from base station 122. The null tones may be localized or distributed in time, frequency or in both time and frequency. Additionally, the measurement resource may be zero power (ZP) interference measurement resource (IMR).

UEv110-2 may communicate the CLI (or RSSI measurements) to base station 122 (at 760). In some implementations, this may also, or alternatively, include a request or recommendation for base station 122 to adjust (e.g., increase) a DL transmission power. In some implementations, UEv 110-2 may be configured to report the measured RRSI through periodic, semi-persistent, or aperiodic reporting. Periodic reporting may include UEv 110-2 reporting an RSSI measurement each time an RSSI measurement is taken. Periodic reporting may be configured with RRC messaging; once configured, periodic reporting may be activated as well (e.g., no further signaling may be needed). Semi-persistent reporting may include UEv 110-2 reporting may be activated via one or more MAC-CEs (e.g., after RRC configuration, one or more MAC-CEs may activate measurement and reporting). Aperiodic reporting may include UEv 110-2 reporting multiple RSSI measurements after several RSSI measurements (e.g., after a cycle of null tones). Aperiodic reporting may be activated via DCI (e.g., PDCCH) and after activation, measurement and/or reporting may be immediate (e.g., unlike periodic reporting or semi-periodic reporting. Base station 122 may determine an appropriate transmission power based on the indication of CLI (or RSSI measurements) and/or may adjust (e.g., increase) DL transmission power to UEv110-2 (at 770). Additionally, base station 122 may communicate with UEv 110-2 using the adjusted DL transmission power (at 780).

Figure 8:
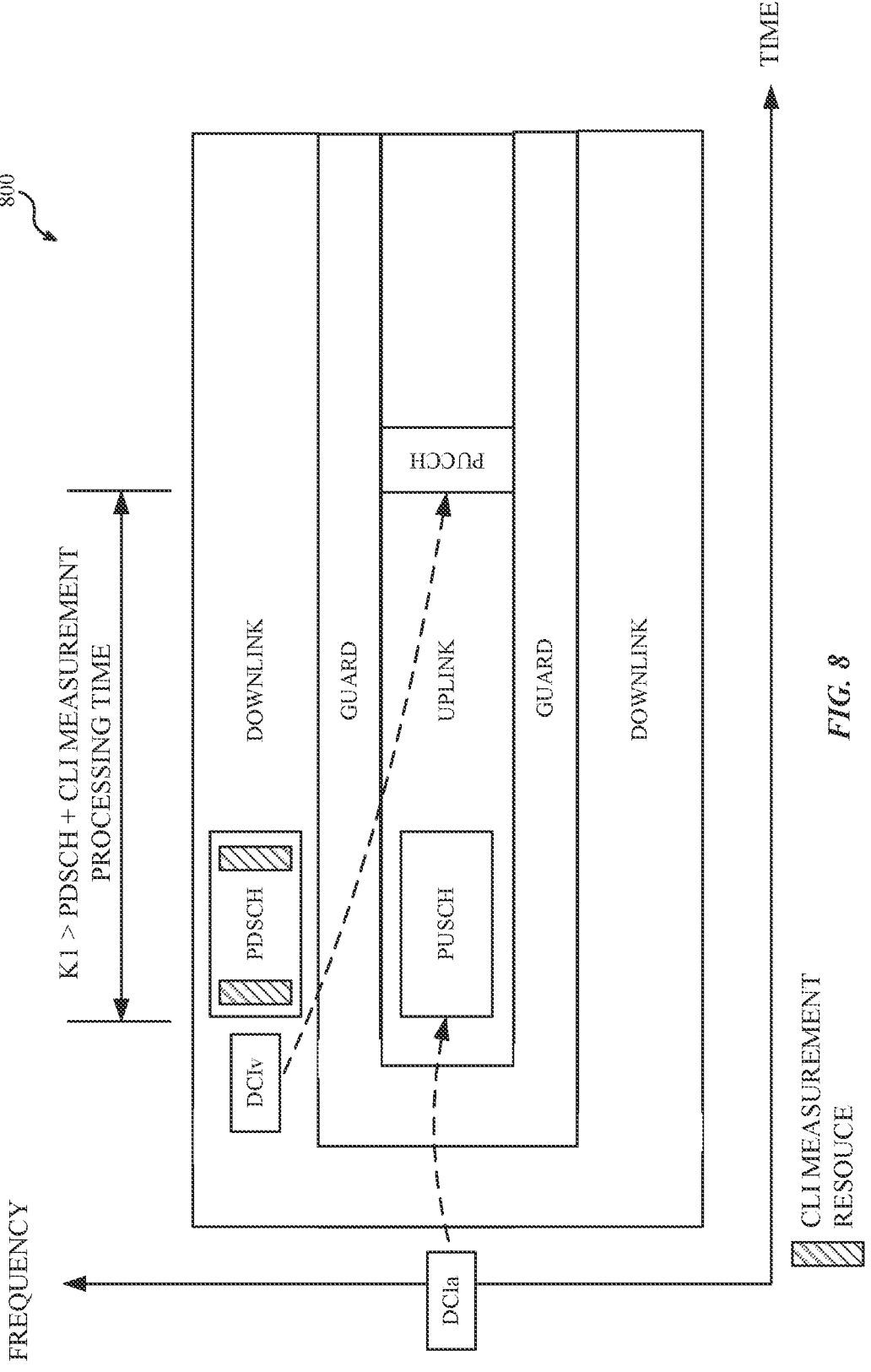
FIG. 8 is a diagram of example of measuring and reporting CLI.

FIG. 8 is a diagram of example 800 of measuring and reporting CLI. As shown, example 800 may include a horizontal axis as a measure of time and a vertical axis as a measure of frequency. UEv 110-2 may receive DCI (e.g., DCIv) from a DL transmission (e.g., via a PDSCH) from base station 122. The DCI may include an indication for UE 110 to perform CLI measurements during time, frequency, or time and frequency resources (e.g., CLI measurement resources, such as times, symbols, PRBs, BWPs, carriers, etc.). The DCI may also indicate that UEv 110-2 is to report the CLI measurements via a PUCCH. As shown, K1 may be greater than a CLI measurement and processing time (e.g., an amount of time involved in measuring RSSI and determining CLI based on the RSSI measurements). K1 may represent a number of slots between the slot that DCI (e.g., PDCCH) is received and the slot that PUCCH is transmitted (e.g., K1=0 may mean the PUCCH is sent in a same slot, while K1=1 may mean that the PUCCH is sent in a next slot). Base station 122 may also send transmission instructions (via DCIa) to UEa 110-1, such that UEa 110-1 transmits SRS while CLI measurement is occurring at UEv 110-2.

CLI measurement may occur during a simultaneous reception of a PDSCH transmission and a PUSCH transmission. The PDSCH transmission may include resources for measuring RSSI. A time/frequency guard or gap may be configured between the PDSCH transmissions and the PUSCH transmissions. After the PDSCH transmission and the CLI measurement and processing time, UE 110 may send a request, recommendation, or another type of message regarding the CLI measurements via a PUCCH to base station 122. In some implementations, when UEv 110-2 is indicated to report HARQ-ACK and CLI measurement (and/or recommendation for DL power adjustment) in the same PUCCH, a timeline for measuring and reporting CLI (e.g., example 800) may depend on UE capability for such simultaneous reporting (e.g., of the HARQ-ACK and CLI. Alternatively, DCIv may indicate PUCCH for HARQ-ACK and PUCCH for CLI report can be another PUCCH (not shown above). In such scenarios, RRC messaging may be used to indicate a time offset between signaling the PUCCH for HARQ-ACK and PUCCH for CLI report.

Figure 9:
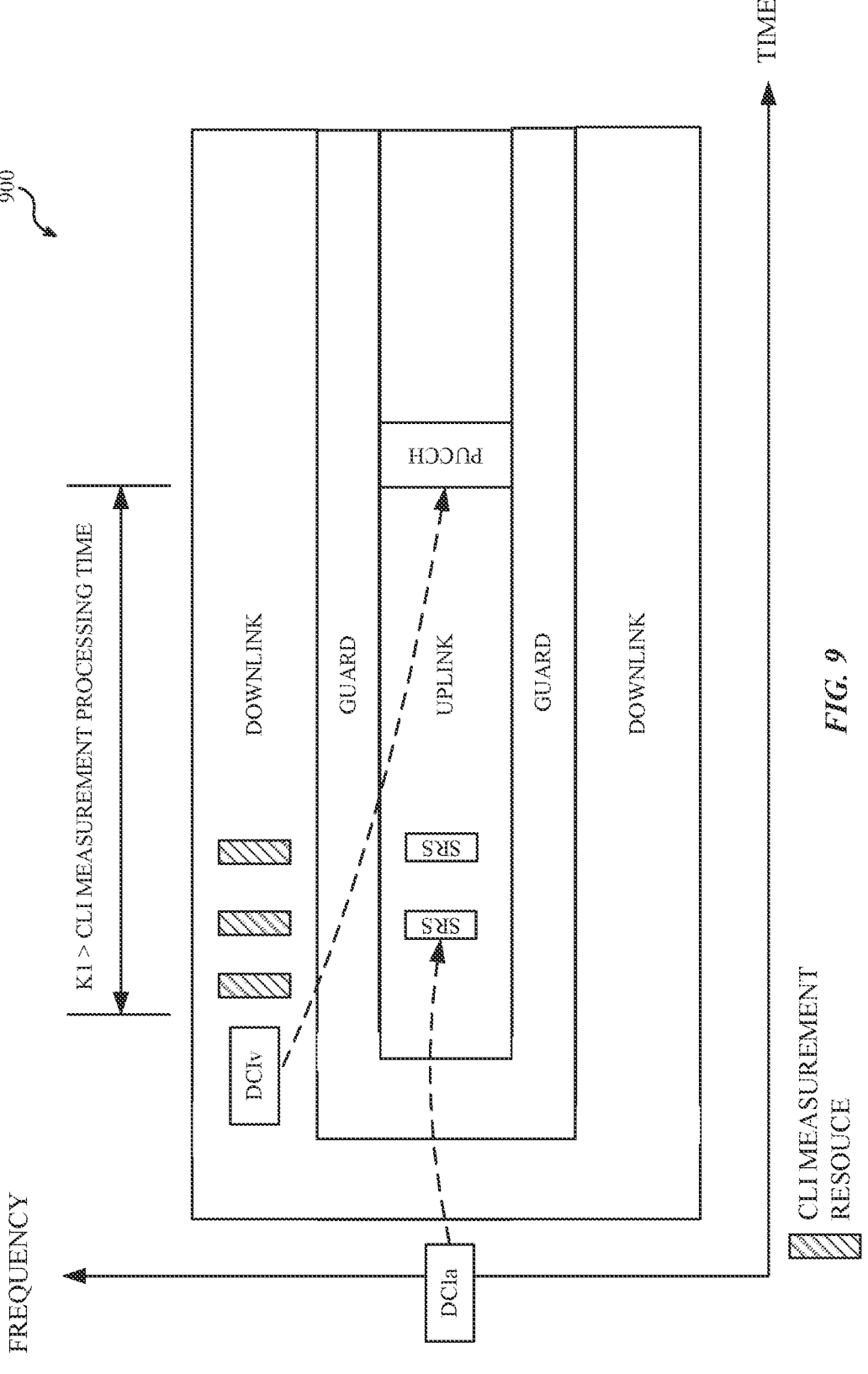
FIG. 9 is a diagram of another example of measuring and reporting CLI.

FIG. 9 is a diagram of another example 900 of measuring and reporting CLI. As shown, example 900 may include a horizontal axis as a measure of time and a vertical axis as a measure of frequency. UEv 110-2 may receive DCI (e.g., DCIv) from a DL transmission (e.g., via a PDSCH) from base station 122. The DCI may include an indication for UE 110 to perform CLI measurements during time, frequency, or time and frequency resources (e.g., CLI measurement resources, such as times, symbols, PRBs, BWPs, carriers, etc.). In some implementations, the CLI measurement resources may include null tones during which UEv 110-2 may measure CLI (e.g., RSSI). The DCI may also indicate that UEv 110-2 is to report the CLI measurements via a PUCCH. As shown, K1 may be greater than a CLI measurement and processing time (e.g., an amount of time involved in measuring RSSI and determining CLI based on the RSSI measurements). K1 may represent a number of slots between the slot that DCI (e.g., PDCCH) is received and the slot that PUCCH is transmitted (e.g., K1=0 may mean the PUCCH is sent in a same slot, while K1=1 may mean that the PUCCH is sent in a next slot). Base station 122 may also send transmission instructions (via DCIa) to UEa 110-1, such that UEa 110-1 transmits SRS while CLI measurement is occurring at UEv 110-2.

UEv 110-2 may perform CLI measurement occur during the CLI measurement resources, which may overlap with a simultaneous reception of a PDSCH transmission and a PUSCH transmission. As shown, only some of the SRS transmissions may overlap with the CLI measurement resources. The PDSCH transmission may include resources for measuring RSSI. A time/frequency guard or gap may be configured between the PDSCH transmissions and the PUSCH transmissions. After the PDSCH transmission and the CLI measurement and processing time, UE 110 may send a request, recommendation, or another type of message regarding the CLI measurements via a PUCCH to base station 122. In some implementations, a single (new) DCI may be used to indicate that UEa 110-1 is to transmit A-SRS and activates ZP-CSI-RS tones at UEv 110-2 for CLI measurement. In some implementations, the SRS transmission from UEa 110-1 may be a P-SRS (or SP-SRS). Additionally, or alternatively, a group of victim UEs (UEv 110-2) may be indicated by a GC-DCI to measure and report CLIs and report on PUCCH resources indicated within GC-DCI.

Figure 10:
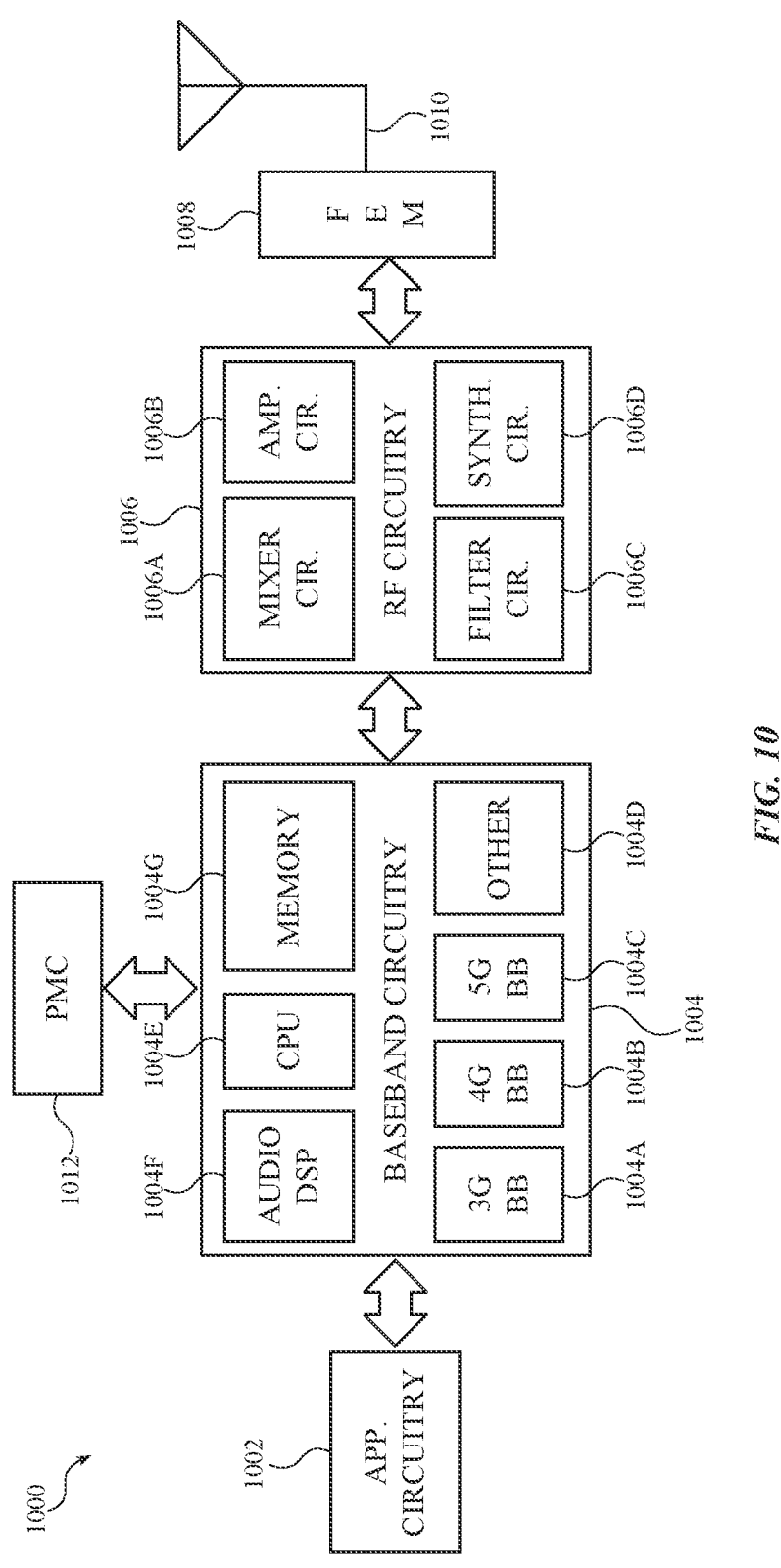
FIG. 10 is a diagram of an example of components of a device according to one or more implementations described herein.

FIG. 10 is a diagram of an example of components of a device according to one or more implementations described herein. In some implementations, the device 1000 can include application circuitry 1002, baseband circuitry 1004, RF circuitry 1006, front-end module (FEM) circuitry 1008, one or more antennas 1010, and power management circuitry (PMC) 1012 coupled together at least as shown. The components of the illustrated device 1000 can be included in a UE or a RAN node. In some implementations, the device 1000 can include fewer elements (e.g., a RAN node may not utilize application circuitry 1002, and instead include a processor/controller to process IP data received from a CN such as 5GC 130 or an Evolved Packet Core (EPC)). In some implementations, the device 1000 can include additional elements such as, for example, memory/storage, display, camera, sensor (including one or more temperature sensors, such as a single temperature sensor, a plurality of temperature sensors at different locations in device 1000, etc.), or input/output (I/O) interface. In other implementations, the components described below can be included in more than one device (e.g., said circuitries can be separately included in more than one device for Cloud-RAN (C-RAN) implementations).

The application circuitry 1002 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1000. In some implementations, processors of application circuitry 1002 can process IP data packets received from an EPC.

The baseband circuitry 1004 can include circuitry such as, but not limited to, one or more single-core or multi-core processors. The baseband circuitry 1004 can include one or more baseband processors or control logic to process baseband signals received from a receive signal path of the RF circuitry 1006 and to generate baseband signals for a transmit signal path of the RF circuitry 1006. Baseband circuitry 1004 can interface with the application circuitry 1002 for generation and processing of the baseband signals and for controlling operations of the RF circuitry 1006. For example, in some implementations, the baseband circuitry 1004 can include a 3G baseband processor 1004A, a 4G baseband processor 1004B, a 5G baseband processor 1004C, or other baseband processor(s) 1004D for other existing generations, generations in development or to be developed in the future (e.g., 2G, 6G, etc.). The baseband circuitry 1004 (e.g., one or more of baseband processors 1004A-D) can handle various radio control functions that enable communication with one or more radio networks via the RF circuitry 1006. In other implementations, some or all of the functionality of baseband processors 1004A-D can be included in modules stored in the memory 1004G and executed via a Central Processing Unit (CPU) 1004E. The radio control functions can include, but are not limited to, signal modulation/demodulation, encoding/decoding, radio frequency shifting, etc. In some implementations, modulation/demodulation circuitry of the baseband circuitry 1004 can include Fast-Fourier Transform (FFT), precoding, or constellation mapping/de-mapping functionality. In some implementations, encoding/decoding circuitry of the baseband circuitry 1004 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1004 can include one or more audio digital signal processor(s) (DSP) 1004F. The audio DSPs 1004F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1004 and the application circuitry 1002 can be implemented together such as, for example, on a system on a chip (SOC).

In some implementations, the baseband circuitry 1004 can provide for communication compatible with one or more radio technologies. For example, in some implementations, the baseband circuitry 1004 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1004 is configured to support radio communications of more than one wireless protocol can be referred to as multi-mode baseband circuitry.

RF circuitry 1006 can enable communication with wireless networks using modulated electromagnetic radiation through a non-solid medium. In various implementations, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some implementations, the receive signal path of the RF circuitry 1006 can include mixer circuitry 1006A, amplifier circuitry 1006B and filter circuitry 1006C. In some implementations, the transmit signal path of the RF circuitry 1006 can include filter circuitry 1006C and mixer circuitry 1006A. RF circuitry 1006 can also include synthesizer circuitry 1006D for synthesizing a frequency for use by the mixer circuitry 1006A of the receive signal path and the transmit signal path. In some implementations, the mixer circuitry 1006A of the receive signal path can be configured to down-convert RF signals received from the FEM circuitry 1008 based on the synthesized frequency provided by synthesizer circuitry 1006D. The amplifier circuitry 1006B can be configured to amplify the down-converted signals and the filter circuitry 1006C can be a low-pass filter (LPF) or band-pass filter (BPF) configured to remove unwanted signals from the down-converted signals to generate output baseband signals. Output baseband signals can be provided to the baseband circuitry 1004 for further processing. In some implementations, the output baseband signals can be zero-frequency baseband signals, although this is not a requirement. In some implementations, mixer circuitry 1006A of the receive signal path can comprise passive mixers, although the scope of the implementations is not limited in this respect.

In some implementations, the mixer circuitry 1006A of the transmit signal path can be configured to up-convert input baseband signals based on the synthesized frequency provided by the synthesizer circuitry 1006D to generate RF output signals for the FEM circuitry 1008. The baseband signals can be provided by the baseband circuitry 1004 and can be filtered by filter circuitry 1006C.

In some implementations, the mixer circuitry 1006A of the receive signal path and the mixer circuitry 1006A of the transmit signal path can include two or more mixers and can be arranged for quadrature down conversion and up conversion, respectively. In some implementations, the mixer circuitry 1006A of the receive signal path and the mixer circuitry 1006A of the transmit signal path can include two or more mixers and can be arranged for image rejection (e.g., Hartley image rejection). In some implementations, the mixer circuitry 1006A of the receive signal path and the mixer circuitry'1006A can be arranged for direct down conversion and direct up conversion, respectively. In some implementations, the mixer circuitry 1006A of the receive signal path and the mixer circuitry 1006A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1006 can include analog-to-digital converter (ADC) and digital-to-analog converter (DAC) circuitry and the baseband circuitry 1004 can include a digital baseband interface to communicate with the RF circuitry 1006.

In some dual-mode implementations, a separate radio IC circuitry can be provided for processing signals for each spectrum, although the scope of the implementations is not limited in this respect.

In some implementations, the synthesizer circuitry 1006D can be a fractional-N synthesizer or a fractional N/N+1 synthesizer, although the scope of the implementations is not limited in this respect as other types of frequency synthesizers can be suitable. For example, synthesizer circuitry 1006D can be a delta-sigma synthesizer, a frequency multiplier, or a synthesizer comprising a phase-locked loop with a frequency divider.

The synthesizer circuitry 1006D can be configured to synthesize an output frequency for use by the mixer circuitry 1006A of the RF circuitry 1006 based on a frequency input and a divider control input. In some implementations, the synthesizer circuitry 1006D can be a fractional N/N+1 synthesizer.

In some implementations, frequency input can be provided by a voltage controlled oscillator (VCO), although that is not a requirement. Divider control input can be provided by either the baseband circuitry 1004 or the applications circuitry 1002 depending on the desired output frequency. In some implementations, a divider control input (e.g., N) can be determined from a look-up table based on a channel indicated by the applications circuitry 1002.

Synthesizer circuitry 1006D of the RF circuitry 1006 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1006D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1006 can include an IQ/polar converter.

FEM circuitry 1008 can include a receive signal path which can include circuitry configured to operate on RF signals received from one or more antennas 1010, amplify the received signals and provide the amplified versions of the received signals to the RF circuitry 1006 for further processing. FEM circuitry 1008 can also include a transmit signal path which can include circuitry configured to amplify signals for transmission provided by the RF circuitry 1006 for transmission by one or more of the one or more antennas 1010. In various implementations, the amplification through the transmit or receive signal paths can be done solely in the RF circuitry 1006, solely in the FEM circuitry 1008, or in both the RF circuitry 1006 and the FEM circuitry 1008.

In some implementations, the FEM circuitry 1008 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1006). The transmit signal path of the FEM circuitry 1008 can include a power amplifier (PA) to amplify input RF signals (e.g., provided by RF circuitry 1006), and one or more filters to generate RF signals for subsequent transmission (e.g., by one or more of the one or more antennas 1010).

In some implementations, the PMC 1012 can manage power provided to the baseband circuitry 1004. In particular, the PMC 1012 can control power-source selection, voltage scaling, battery charging, or DC-to-DC conversion. The PMC 1012 can often be included when the device 1000 is capable of being powered by a battery, for example, when the device is included in a UE. The PMC 1012 can increase the power conversion efficiency while providing desirable implementation size and heat dissipation characteristics.

While FIG. 10 shows the PMC 1012 coupled only with the baseband circuitry 1004. However, in other implementations, the PMC 1012 may be additionally or alternatively coupled with, and perform similar power management operations for, other components such as, but not limited to, application circuitry 1002, RF circuitry 1006, or FEM circuitry 1008.

In some implementations, the PMC 1012 can control, or otherwise be part of, various power saving mechanisms of the device 1000. For example, if the device 1000 is in an RRC_Connected state, where it is still connected to the RAN node as it expects to receive traffic shortly, then it can enter a state known as Discontinuous Reception Mode (DRX) after a period of inactivity. During this state, the device 1000 can power down for brief intervals of time and thus save power.

If there is no data traffic activity for an extended period of time, then the device 1000 can transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1002 and processors of the baseband circuitry 1004 can be used to execute elements of one or more instances of a protocol stack. For example, processors of the baseband circuitry 1004, alone or in combination, can be used execute Layer 3, Layer 2, or Layer 1 functionality, while processors of the baseband circuitry 1004 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 11:
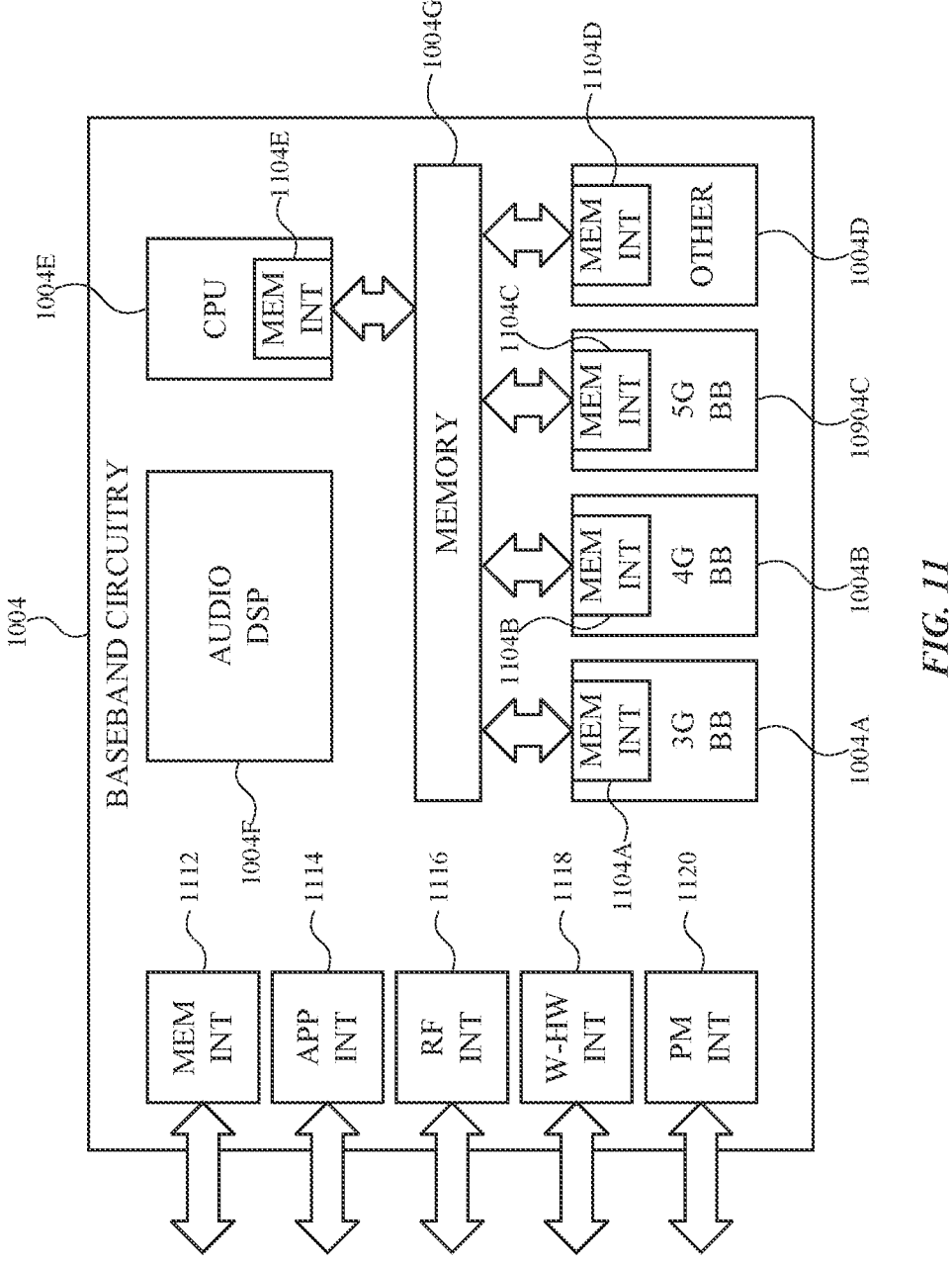
FIG. 11 is a diagram of example interfaces of baseband circuitry according to one or more implementations described herein.

FIG. 11 is a diagram of example interfaces of baseband circuitry according to one or more implementations described herein. As discussed above, the baseband circuitry 1004 of FIG. 10 can comprise processors 1004A-1004E and a memory 1004G utilized by said processors. Each of the processors 1004A-1004E can include a memory interface, 1104A-1104E, respectively, to send/receive data to/from the memory 1004G.

The baseband circuitry 1004 can further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012).

Figure 12:
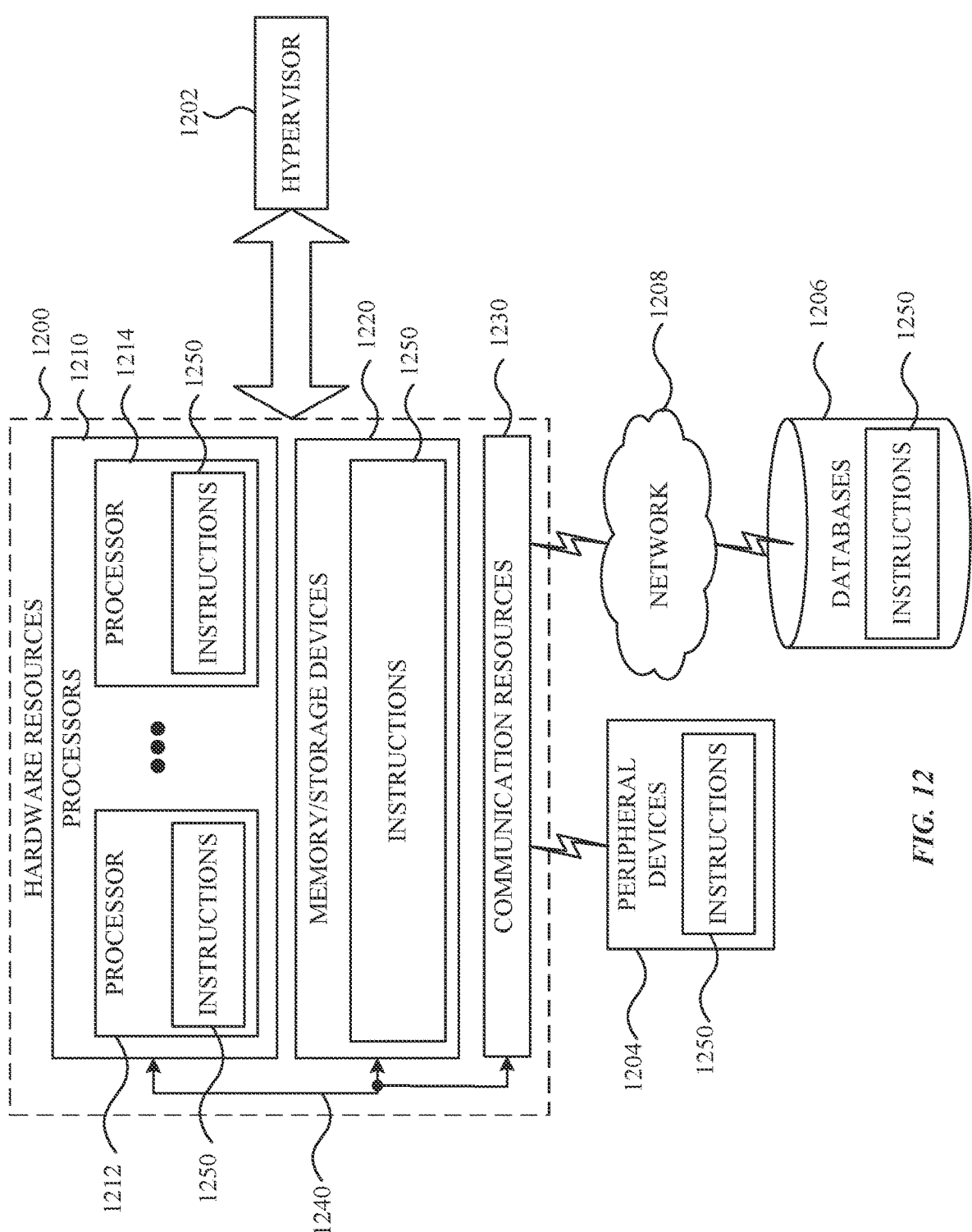
FIG. 12 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a baseband processor of a user equipment (UE) that comprises: one or more processors configured to: receive, from a base station, power control parameters associated with the base station operating in a full duplex (FD) mode; adjust, based on the power control parameters, a transmission power for communicating with the base station; and communicate with the base station using the transmission power.

In example 2, which may also include one or more of the examples described herein, the power control parameters comprise an extended transmission power control (TPC) table comprising 3 bits of information, and the transmission output power is determined based on the 3 bits of information. In example 3, which may also include one or more of the examples described herein, the power control parameters comprise a TPC table comprising 2 bits of information; and the one or more processors are further configured to: determine whether to interpret the 2 bits of information based on a legacy interpretation or based on a reinterpretation of the legacy interpretation; and determine the transmission output power based on the 2 bits of information, and one of the legacy interpretation or the reinterpretation of the legacy interpretation.

In example 4, which may also include one or more of the examples described herein, the 2 bits of information are determined based on the reinterpretation of the legacy interpretation when a message is received, from the base station, indicating that the base station is communicating in the FD mode or is experiencing self-interference. In example 5, which may also include one or more of the examples described herein, the 2 bits of information are determined based on the reinterpretation of the legacy interpretation when a message is received, from the base station, indicating that the reinterpretation of the legacy interpretation is to be used. In example 6, which may also include one or more of the examples described herein, the legacy interpretation and the reinterpretation of the legacy interpretation are used based on a time-frequency pattern indicating when the base station would be in a FD mode.

In example 7, which may also include one or more of the examples described herein, the power control parameters comprise one set of power control parameters of a plurality of sets of power control parameters, and each set of power control parameters, of the plurality of sets of power control parameters, is configured for different power control conditions. In example 8, which may also include one or more of the examples described herein, the power control parameters are received via UE-specific downlink control information (DCI), group common DCI (GC-DCI), a radio resource control (RRC) message, or a media access control (MAC) control element (CE).

In example 9, which may also include one or more of the examples described herein, a baseband processor of a user equipment (UE) that comprises: one or more processors configured to: operate in a full duplex (FD) mode wherein the base station is configured to simultaneously receive uplink (UL) signals and transmit downlink (DL) signals from UEs; and provide power control instructions to user equipment (UEs), the power control instructions comprising: an indication for a victim UE (UEv) to transmit a signal for cross link interference (CLI) measurement by an aggressor UEa (UEa); an indication for the UEa to measure CLI based on the signal from the UEv and a signal from the base station; and an indication for the UEa to adjust a UL transmission power based on the CLI.

In example 10, which may also include one or more of the examples described herein, the signal for CLI measurement comprises a sounding reference signal (SRS). In example 11, which may also include one or more of the examples described herein, the SRS operates as a hybrid automatic repeat request (HARQ) acknowledgement (ACK) response to downlink control information (DCI) used to transmit the indication for the UEv to transit the signal for CLI measurement. In example 12, which may also include one or more of the examples described herein, the indication for the UEa to measure CLI comprises an indication to measure an SRS-RSRP of the signal for CLI measurement from the UEa.

In example 13, which may also include one or more of the examples described herein, the indication for the UEa to measure CLI and the indication for the UEa to measure the CLI are provided via UE-specific DCI or group common DCI (GC-DCI). In example 14, which may also include one or more of the examples described herein, the power control instructions further comprise instructions for the UEa to adjust UL signals based on the CLI. In example 15, which may also include one or more of the examples described herein, the signal for CLI measurement is transmitted by the UEv at a pre-configured transmission power known to the UEa. In example 16, which may also include one or more of the examples described herein, the CLI corresponds to a path loss (PL) between UEv and UEa.

In example 17, which may also include one or more of the examples described herein, a baseband processor of a user equipment (UE) that comprises: one or more processors configured to: operate in a full duplex (FD) mode wherein the base station is configured to simultaneously receive uplink (UL) signals and transmit downlink (DL) signals from UEs; provide power control instructions to user equipment (UEs), the power control instructions comprising: an indication for an aggressor UE (UEa) to transmit a signal for cross link interference (CLI) measurement by a victim UE (UEv); an indication for the UEv to measure CLI based on the signal from the UEa and a signal from the base station, and an indication for the UEv to report the CLI to the base station; receive, from the UEv, an indication of the CLI; and adjust, based on the CLI, a DL transmission power.

In example 18, which may also include one or more of the examples described herein, the signal for CLI measurement comprises a sounding reference signal (SRS) or a physical uplink shared channel (PUSCH) signal. In example 19, which may also include one or more of the examples described herein, the indication for the UEa to measure CLI comprises an indication to measure a receive strength signal indicator (RSSI) over null tones comprising multiple symbols. In example 20, which may also include one or more of the examples described herein, the UEv is configured to measure the CLI based on a measured difference between RSSIs. In example 21, which may also include one or more of the examples described herein, the one or more processors are further configured to: send, to the UEa and based on the CLI, instructions for decreasing a UL transmission power.

In example 22, which may also include one or more of the examples described herein, a method performed by a UE may comprise: receiving, from a base station, power control parameters associated with the base station operating in a full duplex (FD) mode; adjusting, based on the power control parameters, a transmission power for communicating with the base station; and communicating with the base station using the transmission power.

In example 23, which may also include one or more of the examples described herein, a method performed by a base station may comprise: operating in a full duplex (FD) mode wherein the base station is configured to simultaneously receive uplink (UL) signals and transmit downlink (DL) signals from UEs; and providing power control instructions to user equipment (UEs), the power control instructions comprising: an indication for a victim UE (UEv) to transmit a signal for cross link interference (CLI) measurement by an aggressor UEa (UEa); an indication for the UEa to measure CLI based on the signal from the UEv and a signal from the base station; and an indication for the UEa to adjust a UL transmission power based on the CLI.

In example 24, which may also include one or more of the examples described herein, a method performed by a base station may comprise: operating in a full duplex (FD) mode wherein the base station is configured to simultaneously receive uplink (UL) signals and transmit downlink (DL) signals from UEs; providing power control instructions to user equipment (UEs), the power control instructions comprising: an indication for an aggressor UE (UEa) to transmit a signal for cross link interference (CLI) measurement by a victim UE (UEv); an indication for the UEv to measure CLI based on the signal from the UEa and a signal from the base station, and an indication for the UEv to report the CLI to the base station; receive, from the UEv, an indication of the CLI; and adjust, based on the CLI, a DL transmission power.

In example 25, which may also include one or more of the examples described herein, a user equipment (UE) may comprise one or more processors configured to: receive, from a base station, power control parameters associated with the base station operating in a full duplex (1-D) mode; adjust, based on the power control parameters, a transmission power for communicating with the base station; and communicate with the base station using the transmission power.

In example 26, which may also include one or more of the examples described herein, a user equipment (UE) may comprise: one or more processors configured to: operate in a full duplex (FD) mode wherein the base station is configured to simultaneously receive uplink (UL) signals and transmit downlink (DL) signals from UEs; and provide power control instructions to user equipment (UEs), the power control instructions comprising: an indication for a victim UE (UEv) to transmit a signal for cross link interference (CLI) measurement by an aggressor UEa (UEa); an indication for the UEa to measure CLI based on the signal from the UEv and a signal from the base station; and an indication for the UEa to adjust a UL transmission power based on the CLI.

In example 27, which may also include one or more of the examples described herein, a base station may comprise: one or more processors configured to: operate in a full duplex (FD) mode wherein the base station is configured to simultaneously receive uplink (UL) signals and transmit downlink (DL) signals from UEs; provide power control instructions to user equipment (UEs), the power control instructions comprising: an indication for an aggressor UE (UEa) to transmit a signal for cross link interference (CLI) measurement by a victim UE (UEv); an indication for the UEv to measure CLI based on the signal from the UEa and a signal from the base station, and an indication for the UEv to report the CLI to the base station; receive, from the UEv, an indication of the CLI; and adjust, based on the CLI, a DL transmission power.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor, comprising:
one or more processors coupled to a memory and, when executing instructions stored in the memory, configured to:
determine a transmission power control (TPC) table for uplink power control associated with a base station;
adjust, based on the TPC table, a transmission power for communicating with the base station, wherein the TPC table indicates a first set of transmission power control parameters in response to the base station operating in a non-full-duplex (non-FD) mode and indicates a second set of transmission power control parameters in response to the base station operating in a full duplex (FD) mode; and
communicate with the base station using the adjusted transmission power.

2. The baseband processor of claim 1, wherein the TPC table includes a first set of bit values mapped to the first set of transmission power control parameters and a second set of bit values mapped to the second set of transmission power control parameters.

3. The baseband processor of claim 1, wherein
the first set of transmission power control parameters and the second set of transmission power control parameters are determined respectively based on a first interpretation of the TPC table for the non-FD mode and a second interpretation for the FD mode.

4. The baseband processor of claim 3, wherein the second interpretation of the TPC table is based on a message, received from the base station, indicating that the base station is communicating in the FD mode or is experiencing self-interference.

5. The baseband processor of claim 3, wherein the second interpretation of the TPC table is based on a message, received from the base station, indicating that the second interpretation is to be used.

6. The baseband processor of claim 3, wherein the first interpretation or the second interpretation is based on a time-frequency pattern indicating the base station operating in the non-FD mode or the FD mode.

7. The baseband processor of claim 1, wherein the transmission power is adjusted based on a transmit power offset, a path-loss compensation factor, and the first set or the second set of transmission power control parameters for a closed-loop power control adjustment.

8. The baseband processor of claim 1, wherein the TPC table is received via UE-specific downlink control information (DCI), group common DCI (GC-DCI), a radio resource control (RRC) message, or a media access control (MAC) control element (CE).

9. The baseband processor of claim 1, wherein the TPC table comprises 3-bit information, and wherein four bit values of the 3-bit information are mapped to the first set of transmission power control parameters and another four bit values of the 3-bit information are mapped to the second set of transmission power control parameters for a close-loop transmission power adjustment.

10. The baseband processor of claim 1, wherein the first set of transmission power control parameters corresponds to −1, 0, 1, and 3 dB, and wherein the second set of transmission power control parameters corresponds to 0, 3, 6, and 9 dB.

11. The baseband processor of claim 1, wherein the TPC table comprises two bits of information, and wherein the two bits are mapped under a first interpretation to the first set of transmission power control parameters and are mapped under a second interpretation to the second set of transmission power control parameters.

12. A method, performed by a user equipment (UE), comprising:
determining a transmission power control (TPC) table used for uplink power control associated with a base station;
determining, based on the TPC table and in response to an interference of uplink and downlink at the base station meeting a threshold, a first set of power control parameters for adjusting a transmission power for communicating with the base station operating in a full duplex (FD) mode; and
communicating with the base station using the adjusted transmission power.

13. The method of claim 12, wherein the transmission power is determined based on a subset of bit values of the TPC table mapped to the FD mode.

14. The method of claim 12, further comprising:
determining to interpret the TPC table based on a first interpretation for a non-full-duplex (non-FD) mode or based on a second interpretation for the FD mode; and
determining the transmission power based on the TPC table, and one of the first interpretation and the second interpretation.

15. The method of claim 14, further comprising receiving an indication to use the second interpretation of the TPC table.

16. The method of claim 15, wherein the indication is included in downlink control information (DCI).

17. The method of claim 15, wherein the indication comprises that the base station is communicating in the FD mode.

18. The method of claim 12, wherein the first set of power control parameters is different from a second set of power control parameters associated with the base station operating in a non-full-duplex mode.

19. A method, comprising:

determining, based on a signal from a base station, whether the base station operates in a non-full-duplex (non-FD) mode or in a full-duplex (FD) mode;

determining, based on the base station operating in the non-FD mode or the FD mode, a first interpretation or a second interpretation of a transmission power control (TPC) table, respectively;

determining, based on the TPC table and one of the first interpretation or the second interpretation, a transmission power for communicating with the base station; and communicating with the base station using the transmission power.

20. The method of claim 19, wherein the TPC table comprises two bits of information, and the first interpretation and the second interpretation each apply to the same two bits to map the two bits respectively to a first set of transmission power control parameters for the non-FD mode and a second set of transmission power control parameters for the FD mode.

* * * * *